US012787926B2

(12) United States Patent
Missotten et al.

(10) Patent No.: US 12,787,926 B2
(45) Date of Patent: Nov. 10, 2026

(54) SYSTEMS AND METHODS FOR CROP MATERIAL SENSING FOR AN AGRICULTURAL HEADER

(71) Applicant: CNH Industrial America LLC, New Holland, PA (US)

(72) Inventors: Bart M. A. Missotten, Herent (BE); Dre Waltherus Joachim Jongmans, Klundert (NL); Cory Douglas Hunt, Millersville, PA (US); Eric Lee Walker, Narvon, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 432 days.

(21) Appl. No.: 18/483,377

(22) Filed: Oct. 9, 2023

(65) Prior Publication Data

US 2024/0122107 A1 Apr. 18, 2024

Related U.S. Application Data

(60) Provisional application No. 63/416,094, filed on Oct. 14, 2022.

(51) Int. Cl.

| | |
|---|---|
| ***A01D 41/127*** | (2006.01) |
| ***A01D 41/14*** | (2006.01) |
| ***A01D 45/02*** | (2006.01) |

(52) U.S. Cl.

CPC ....... *A01D 41/127* (2013.01); *A01D 41/1271* (2013.01); *A01D 41/141* (2013.01); *A01D 45/021* (2013.01)

(58) Field of Classification Search

CPC .............. A01D 41/127; A01D 41/1271; A01D 41/1272; A01D 41/1273; A01D 41/1277; A01D 41/141; A01D 45/02; A01D 45/021; A01D 45/025

See application file for complete search history.

(56) References Cited

U.S. PATENT DOCUMENTS 4,951,031 A * 8/1990 Strubbe .............. A01D 41/1273 340/684
9,320,196 B2 4/2016 Dybro et al.
9,832,928 B2 12/2017 Dybro et al.

(Continued)

FOREIGN PATENT DOCUMENTS

DE 102022100749 A1 7/2022
EP 2944179 B1 11/2017
WO WO-2020126211 A1 * 6/2020 ............. A01F 12/44

OTHER PUBLICATIONS

Extended European Search Report and Written Opinion for EP Application No. 23203616.0 dated Apr. 4, 2024 (7 pages).

*Primary Examiner* — Alicia Torres
(74) *Attorney, Agent, or Firm* — Fletcher Yoder, P.C.

(57) ABSTRACT

An agricultural system includes a header having a row unit with a feed roller configured to engage a crop and to pull a stalk of the crop toward the field. The header also includes a conveyor configured to receive a desirable crop material of the crop from the row unit and to direct the desirable crop material of the crop toward an inlet of the agricultural system. The header further includes a sensor system configured to detect presence of material other than grain (MOG) proximate to or at the conveyor.

18 Claims, 4 Drawing Sheets

(56) References Cited

U.S. PATENT DOCUMENTS

| | | | | |
|---|---|---|---|---|
| 10,049,296 | B2 * | 8/2018 | Walker ............... | A01D 41/1273 |
| 10,537,060 | B2 | 1/2020 | Sauder et al. | |
| 2018/0084721 | A1 | 3/2018 | Walker | |
| 2019/0110394 | A1 | 4/2019 | VanNahmen | |
| 2021/0137006 | A1 | 5/2021 | Shearer et al. | |
| 2022/0232770 | A1 * | 7/2022 | Yanke .................. | A01D 41/127 |

* cited by examiner

SYSTEMS AND METHODS FOR CROP MATERIAL SENSING FOR AN AGRICULTURAL HEADER

CROSS-REFERENCE TO RELATED APPLICATION

This application claims priority to and the benefit of U.S. Provisional Application No. 63/416,094, entitled "SYSTEMS AND METHODS FOR CROP MATERIAL SENSING FOR AN AGRICULTURAL HEADER," filed Oct. 14, 2022, which is hereby incorporated by reference in its entirety for all purposes.

BACKGROUND

The present disclosure generally relates to an agricultural system, and more particularly, to sensing crop material during a harvesting operation performed by an agricultural header of the agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. The harvester may include or be coupled to a header, which may be designed to efficiently harvest certain types of crops. For example, a corn header may be designed to efficiently harvest corn. In particular, the corn header may include row units that include components that operate to separate ears of corn from stalks as the harvester travels through a field. Conveyors (e.g., augers) carry the ears of corn toward processing machinery and/or storage compartments of the harvester, while the stalks are deposited back into the field.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an agricultural system includes a header having a row unit with a feed roller configured to engage a crop and to pull a stalk of the crop toward the field. The header also includes a conveyor configured to receive a desirable crop material of the crop from the row unit and to direct the desirable crop material of the crop toward an inlet of the agricultural system. The header further includes a sensor system configured to detect presence of material other than grain (MOG) proximate to or at the conveyor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
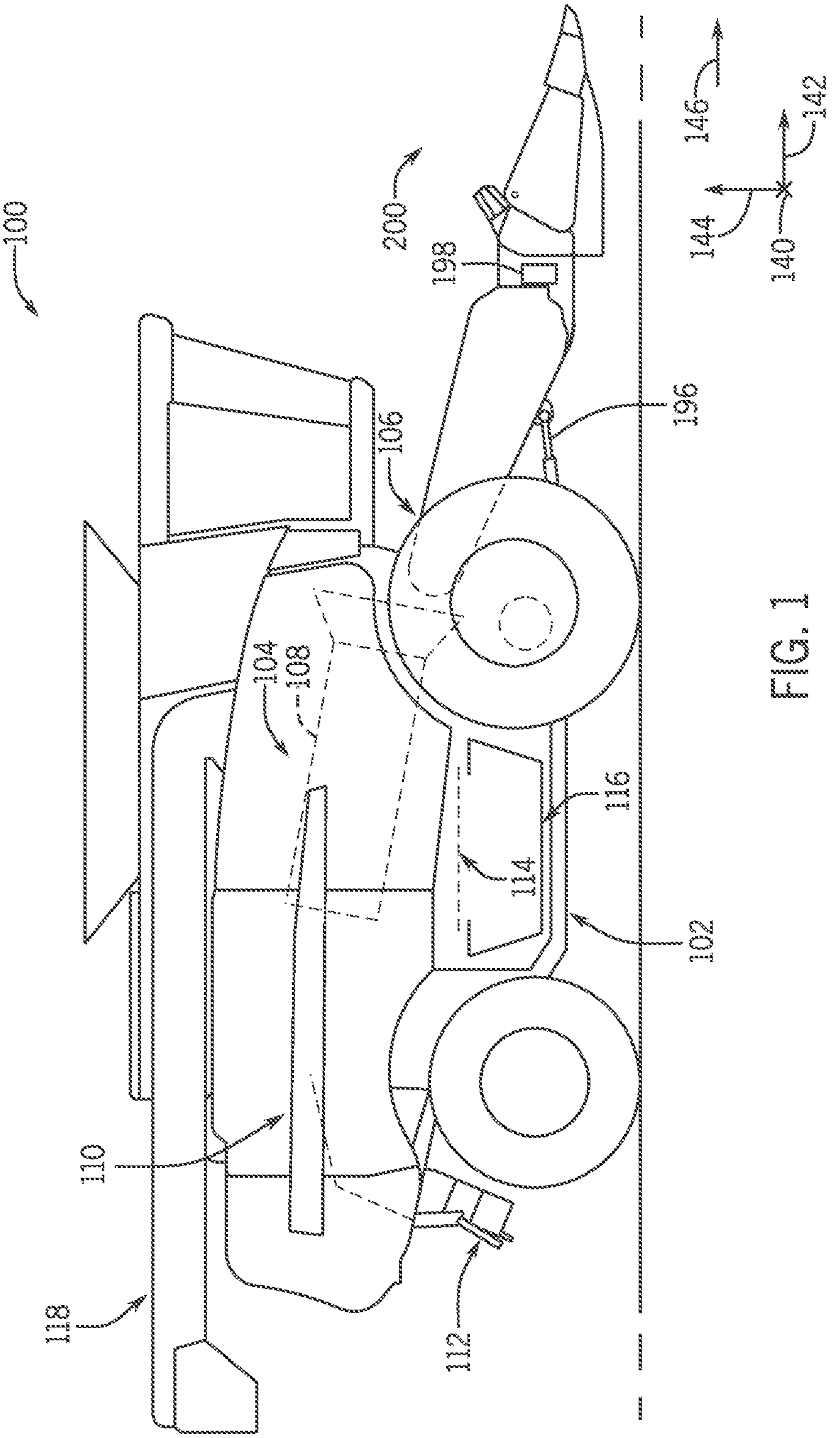
FIG. 1 is a side view of an agricultural system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may include or be coupled to a header to harvest crops within the field. The header may be a corn header that is designed to efficiently harvest corn within the field. The corn header may include multiple row units arranged across a width of the corn header, and each row unit may include deck plates, feed rollers, and/or other components that operate to separate ears of corn from stalks and other materials other than grain (MOG) as the harvester travels through the field. Conveyors (e.g., augers) carry the ears of corn into the harvester (e.g., a chassis of the harvester), such as toward processing machinery and/or storage compartments of the harvester, while the stalks are deposited back into the field.

In some circumstances, the corn header may not discharge certain MOG (e.g., portions of stalk), and such MOG may be further processed as a result. For example, the corn header may not completely separate an ear from the MOG and/or may not discharge the MOG before the MOG is directed to the conveyors. As a result, the conveyors may carry the MOG into the harvester. The operation of the harvester to process corn may be affected by such MOG. For instance, the harvester may perform additional operations to process the MOG, such as to separate the MOG from processed corn. Additionally or alternatively, the presence of MOG may reduce efficiency or effectiveness of operation to process the corn. As a result, the MOG may cause excessive consumption of resources, such as fuel or other energy, during operation of the harvester.

Thus, it is presently recognized that identifying potential entry of MOG into the harvester may be beneficial, such as to provide operational adjustments to mitigate such entry of MOG and/or to block further entry of MOG into the harvester. Accordingly, present embodiments relate generally to a MOG sensor system that may detect a presence of MOG (e.g., a height of a stalk) that is likely to be directed to and/or is being directed by the conveyors to indicate MOG that may potentially enter the chassis of the harvester. In some embodiments, the MOG sensor system may include an emitter and a receiver pair. The emitter is configured to transmit a signal adjacent to the conveyors for receipt by the receiver. Presence of MOG may interrupt (e.g., block) receipt of the signal by the receiver. Thus, the presence of MOG may be indicated by signal receipt by the receiver, such as by a property or absence of the signal at the receiver.

The harvester may also include a control system communicatively coupled to the MOG sensor system. The control system may receive sensor data from the MOG sensor system, and the sensor data may indicate whether MOG is detected proximate to or at the conveyors, such as between the conveyor and a roller (e.g., an end of the roller) that directs crop material toward the conveyor. In response to determining that MOG is detected based on the sensor data, the control system may output a control signal. As an example, the control signal may automatically adjust an operation of the harvester (e.g., to increase speed of a feed roller to discharge the MOG more quickly; to decrease travel speed of the harvester to enable the feed roller to discharge the MOG before the MOG is shifted to the conveyors). Additionally or alternatively, the control signal may provide a notification or an indication to a user (e.g., an operator) of the detected MOG to prompt the user to adjust or inspect the operation of the harvester. Thus, the control system may monitor the detection of MOG and output the control signal to reduce entry of MOG into the chassis and improve operation of the harvester.

With the foregoing in mind, FIG. 1 is a side view of an embodiment of an agricultural system 100, which may be a harvester. The agricultural system 100 includes a chassis 102 configured to support a header 200 (e.g., a corn header) and an agricultural crop processing system 104. The header 200 is configured to receive crops (e.g., ears of corn) from a field and to transport the crops toward an inlet 106 of the agricultural crop processing system 104 for further processing of the crops. The header 200 may also separate desirable crop material from MOG (e.g., stems, leaves, stalks, husks, pods, other crop residue). The agricultural crop processing system 104 receives the crops from the header 200 for further processing. For example, the agricultural crop processing system 104 may include a thresher 108 having a cylindrical threshing rotor that transports the crops in a helical flow path through the agricultural system 100. In addition to transporting the crops, the thresher 108 may further separate certain desirable crop material (e.g., grain) from the MOG and may enable the desirable crop material to flow into a cleaning system 114 (e.g., sieves) located beneath the thresher 108. The cleaning system 114 may remove debris from the desirable crop material and transport the desirable crop material to a storage tank 116 within the agricultural system 100. When the storage tank 116 is full, a tractor with a trailer may pull alongside the agricultural system 100. The desirable crop material collected in the storage tank 116 may be carried up by an elevator and dumped out of an unloader 118 into the trailer.

The header 200 may directly distribute and discharge MOG onto the field to block or avoid entry of the MOG into the chassis 102, such as the agricultural crop processing system 104. In some embodiments, the agricultural system 100 may include a MOG handling system 110 that receives any MOG that is not discharged directly from the header 200, and the MOG handling system 110 transports the MOG to a MOG spreading system 112 positioned at an aft end of the agricultural system 100. The MOG spreading system 112 distributes the MOG onto the field to facilitate performance of other operations. Distribution of the MOG onto the field may facilitate a subsequent operation (e.g., a tillage operation) that removes the MOG from the field. In some embodiments, the header 200 and/or the MOG handling system 110 may reduce a size of the MOG (e.g., by chopping the MOG) into finer particles to facilitate distribution of the MOG. To facilitate discussion, the header 200 may be described with reference to a lateral axis or direction 140, a longitudinal axis or direction 142, and a vertical axis or direction 144. The agricultural system 100 and/or its components may also be described with reference to a direction of travel 146.

In the illustrated embodiment, the agricultural system 100 may include one or more actuators configured to manipulate the spatial orientation and/or position of the header 200 with respect to the chassis 102 and/or with respect to the crop rows/ground/soil. A header height actuator 196 may drive the header 200 to move along the vertical axis 144 relative to the ground. The header 200 may be attached to the chassis 102 via a four bar linkage. The position of the four bar linkage may be manipulated by the header height actuator 196 to adjust the height of the header 200. The agricultural system 100 may also include a header orientation actuator 198. The header orientation actuator 198 may be configured to rotate the angular orientation of the header 200 (e.g., the entire header 200 or a portion thereof) relative to the ground. The actuators may be manipulated in response to one or more stimuli to adjust the agricultural system 100 to one or more environmental variables (e.g., soil condition, terrain, crop damage). As discussed herein, the agricultural system 100 may include a MOG sensor system that includes one or more sensors (e.g., a through beam sensor, a radar sensor), and the MOG sensor system may monitor a presence of MOG (e.g., an undesirable volume and/or occurrence of MOG) on the header 200. In some embodiments, the header 200 may be operated based on the presence of MOG on the header 200.

Figure 2:
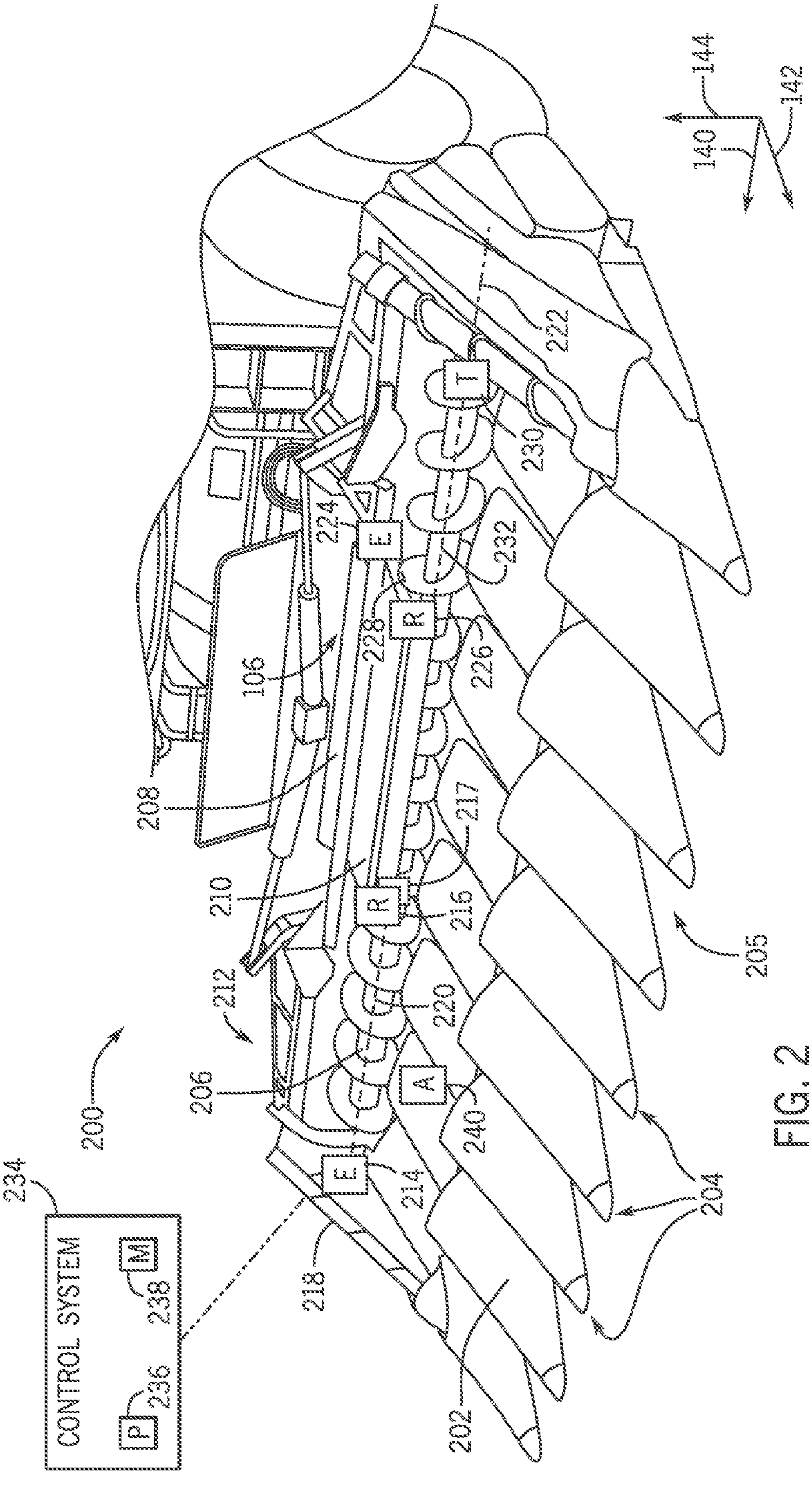
FIG. 2 is a perspective side view of a header that may be employed within the agricultural system of FIG. 1, in accordance with an embodiment of the present disclosure.

FIG. 2 is a perspective view of an embodiment of the header 200 that may be employed within the agricultural system 100 of FIG. 1. In the illustrated embodiment, the header 200 is a corn header and includes multiple dividers 202 configured to separate rows of a crop (e.g., corn). The dividers 202 may be distributed across a width of the header 200 (e.g., along the lateral axis 140). As the header 200 moves along a path, the dividers 202 may direct the crops from each row to one or more row units 204. The row units 204 are configured to receive a portion of cut crop (e.g., a stalk) at a picking location 205. A portion of the crop may be directed to one of a pair of conveyors 206 (e.g., augers)

configured to convey the portion of the crop laterally inward to a center crop conveyor 208 at a center of the header 200, and the center crop conveyor 208 directs the portion of the crop toward the inlet 106 of the agricultural crop processing system. As illustrated, the conveyors 206 extend along a substantial portion of the width of the header 200 (e.g., along the lateral axis 140). The conveyors 206 may be driven by a drive mechanism (e.g., electric motor, hydraulic motor). A hood 210 is positioned rearward of each divider 202, such as proximate to or at the inlet 106. The hood 210 extends over and covers various components, such as a portion of the conveyors 206 and/or a portion of the dividers 202 to block unwanted discharge of the portion of the crop from the header 200, thereby facilitating guidance of the portion of the crop to the inlet 106 and/or shielding such components from external elements (e.g., block impingement of debris onto the components) to maintain operation of the components.

The header 200 may separate the desirable crop material and MOG from one another to facilitate directing the desirable crop material into the agricultural crop processing system via the inlet 106 and avoid entry of the MOG into the agricultural crop processing system via the inlet 106. For example, operation of the row units 204 may direct the desirable crop material to the conveyors 206 and discharge the MOG away from the conveyors 206 (e.g., onto the field). Thus, directing of the MOG to the inlet 106 onto the conveyors 206 may be avoided. The agricultural system also includes a MOG sensor system 212 positioned on the header 200 to detect MOG that may be potentially directed toward the inlet 106. For instance, the MOG sensor system 212 may monitor presence of MOG proximate to or at the conveyors 206, such as rearward or downstream of the picking location 205 and/or forward or upstream of the conveyors 206 (e.g., a portion of the conveyors 206 aligned with a rear portion of the row units 204, a portion of the row units along the longitudinal axis 142). The presence of MOG proximate to or at the conveyors 206 may indicate whether the conveyors 206 are likely to receive and/or are directing MOG toward the inlet 106. As such, detections made by the MOG sensor system 212 may be used to determine whether MOG is likely to be or is being undesirably directed into the agricultural crop processing system.

The MOG sensor system 212 includes an emitter 214 and a receiver 216. The emitter 214 is coupled to a side wall 218 (e.g., an end sheet) of the header 200, such as at a position laterally exterior to the conveyors 206, and the receiver 216 is coupled to the hood 210 (e.g., to a respective side wall of the hood 210 that faces the side wall 218 of the header 200). For instance, the header 200 may include a support 217, such as a bracket, an enclosure, or a cantilever, and the receiver 216 may be coupled to the support 217. During operation, the emitter 214 is configured to transmit a signal 220 toward the receiver 216. For example, the emitter 214 transmits the signal 220 along (e.g., substantially parallel to) a rotational axis 222 about which the conveyors 206 rotate, such as between the conveyors 206 the row units 204 and across multiple row units 204. To this end, the support 217 may be arranged (e.g., positioned at an upstream or front end of the hood 210, extending toward the picking location 205, extending away from the conveyors 206), such as coupled to the hood 210, to position the receiver 216 forward of the conveyors 206 and to enable the signal 220 to travel along a rear portion of the row units 204 and/or forward of the conveyors 206. Presence of MOG proximate to or at the conveyors 206 may interrupt receipt of the signal 220 by the receiver 216. As an example, the signal 220 transmitted by the receiver 216 may include an electromagnetic wave (e.g., infrared light, visible light), and the presence of MOG proximate to or at the conveyors 206 may block receipt of the signal 220 at the receiver 216. For instance, as the row units 204 direct crops (e.g., desirable crop material, MOG) toward the conveyors 206, the row units 204 may pull the MOG (e.g., stalk) downwardly toward the field. Thus, less MOG may protrude above the row unit 204 as the crops are directed toward the conveyors 206. However, a row unit 204 that does not fully discharge the MOG onto the field, and therefore causes the MOG to potentially enter the conveyors 206, may cause a portion of the MOG to remain protruding above the row unit 204 (e.g., along the vertical axis 144), and the portion of the MOG may cross the path of travel of the signal 220 to block receipt of the signal 220 at the receiver 216. Thus, an absence of the signal 220 received by the receiver 216 may indicate MOG proximate to or at the conveyors 206, such as at a portion (e.g., a rearward portion) of the multiple row units 204, between the row units 204 and the conveyors 206, and/or being carried by the conveyors 206. Each of the emitter 214 and the receiver 216 may be positioned to avoid detection of desirable crop material. In other words, desirable crop material may not affect the path of travel of the signal 220. For example, the emitter 214 and the receiver 216 may be positioned such that the signal 220 is generally transmitted above the desirable crop material as it flows through the multiple row units 204 to the conveyors 206 and/or above the conveyors 206 along the vertical axis 144.

In some embodiments, the sensor system may include multiple emitter and receiver pairs, each of which is configured to transmit or receive, respectively, a signal directed along the rotational axis 222. Multiple emitter and receiver pairs (e.g., two emitter and receiver pairs, three emitter and receiver pairs, four or more emitter and receiver pairs) may be arranged, such as in a rectangular formation or diamond formation, to provide redundancy that confirms presence of MOG proximate to or at the conveyors 206. By way of example, absence of respective signals received at multiple receivers may indicate MOG protruding above the portion of the multiple row units 204 along the vertical axis 144 (e.g., instead of being adequately fed downward toward the field by a time that the MOG reaches the portion of the multiple row units 204 for discharge to the field), MOG proximate to and/or on the conveyors 206, and/or entry of MOG into the agricultural crop processing system. However, absence of a respective signal received at a single receiver, but successful receipt of respective signals received at remaining signals may indicate a faulty detection or faulty operation of an emitter and/or of a receiver. Additionally or alternatively, the emitter and receiver pairs may be arranged, such as adjacent to one another in a direction along the row units 204 (e.g., along the longitudinal axis 142), to enable detection of the location of MOG. For instance, the absence of respective signals at particular receivers may indicate a location of detected MOG, such as with respect to the row units 204 and/or with respect to the conveyors 206 (e.g., with respect to the longitudinal axis 142 and/or the vertical axis 144). Thus, the arrangement of emitter and receiver pairs may provide more granular detections related to the presence of MOG. Furthermore, the emitter and receiver pairs may be arranged, such as adjacent to one another along the vertical axis 144, to enable detection of an amount of MOG that is not discharged onto the field. By way of example, a quantity of receivers that do not receive the respective signals may indicate a height of MOG that protrudes above the row units 204 and is being carried into the conveyors 206.

In embodiments in which multiple emitter and receiver pairs are incorporated, each receiver may be configured to receive a signal from a corresponding emitter. For this reason, the sensors may be arranged to block a receiver from receiving a signal transmitted from a non-corresponding emitter (e.g., an emitter that transmits the signal intended for receipt by a different receiver). As an example, each emitter may be configured to transmit a respective signal having a particular characteristic (e.g., a particular frequency, a particular wavelength, a particular intensity), and each receiver may be configured to detect receipt of the respective signal having a corresponding particular characteristic. Each receiver also may not be able to detect receipt of a signal that does not have the corresponding particular characteristic, thereby avoiding detection of a signal transmitted from a non-corresponding emitter. As another example, adjacent emitter and receiver pairs may have alternating emitter and receiver arrangements. For instance, an emitter of a first emitter and receiver pair may be positioned adjacent to a receiver of a second emitter and receiver pair. Such arrangements of emitter and receiver pairs may enable each receiver to detect receipt of an intended signal (e.g., from a corresponding emitter) and more accurately detect presence of MOG. For example, a detected receipt of a signal by the receiver may more accurately indicate that no MOG is present proximate to and/or at the conveyors, instead of that a signal from a non-corresponding emitter is being directed to the receiver, thereby enabling the MOG sensor system to indicate the presence of MOG more accurately. As a result, the control system may also operate more suitably based on the sensor data received from the MOG sensor system.

The MOG sensor system 212 may include an emitter 224 and a receiver 226 that are each coupled to the hood 210. The emitter 224 is configured to transmit a signal 228 in a direction crosswise (e.g., obliquely) to the rotational axis 222, such as along a single row unit 204. The presence of MOG proximate to or at the conveyors 206 may similarly interrupt the receipt of the signal 228 by the receiver 226. Thus, the absence of receipt of the signal 228 at the receiver 226 may indicate MOG being directed toward the conveyors 206 and/or into the inlet 106 by the conveyors 206. The arrangement of the emitter 224 and the receiver 226 may also indicate a location in which MOG is detected. For example, the emitter 224 and the receiver 226 may be laterally aligned with a particular one of the row units 204. Thus, absence of the receipt of the signal 228 by the receiver 226 may indicate that MOG is detected at the particular row unit 204 with which the emitter 224 and the receiver 226 are aligned. As such, the location of the MOG may be determined based on a corresponding location of the receiver 226 that does not receive the signal 228. Indeed, multiple emitter and receiver pairs may be arranged in a manner similarly as that of the emitter 224 and the receiver 226 (e.g., distributed along the lateral axis 140), and such emitter and receiver pairs may be laterally aligned with different row units. For example, the emitter and the receiver may be coupled to adjacent dividers, and the signal transmitted by the emitter may extend along a single row unit. The absence of a respective signal received at one of the receivers may indicate a location of the detected MOG with respect to the row unit corresponding to the receiver. For example, the absence of a signal received at a particular receiver may indicate that at least a portion of MOG may not be successfully discharged from the header at a corresponding row unit laterally aligned with the particular receiver, thereby causing the MOG to be directed onto the conveyors.

The sensor system may also include one or more emitter and receiver pairs positioned in any other suitable manner and/or coupled to any other suitable component of the header in additional or alternative embodiments. As an example, a receiver may be coupled to the side wall of the header, and an emitter may be coupled to the hood (e.g., to the support attached to the hood). As another example, the sensor system may include an emitter and a receiver positioned at opposite side walls of the header. Thus, the signal transmitted by the emitter may span between the side walls (e.g., instead of from one side wall to the hood). Additionally or alternatively, an emitter and a receiver may be positioned such that the emitter may transmit a signal in an oblique direction relative to the rotational axis 222. It should be appreciated that multiple emitters and multiple receives may be positioned in any of these arrangement (or any combination of the arrangements disclosed herein), for example.

Furthermore, the MOG sensor system 212 may include a transceiver 230 (e.g., a radar sensor, a light detection and ranging sensor). The transceiver 230 is configured to transmit a signal 232 (e.g., a radar signal) along the rotational axis 222. Presence of MOG may interrupt the path of travel of the signal 232. For example, MOG may reflect or deflect a portion of the signal 232 toward the transceiver 230. Thus, receipt of the reflected signal 232 by the transceiver 230 may indicate presence of MOG proximate to or at the conveyors 206. A remaining portion of the signal 232 may penetrate the MOG and continue its path of travel along the rotational axis 222. However, presence of additional MOG may interrupt the path of travel of the remaining portion of the signal 232 and reflect or deflect part of the remaining portion of the signal 232 to the transceiver 230. In this way, the transceiver 230 may receive different portions of the signal 232 that are reflected by MOG positioned at different locations (e.g., different locations along the rotational axis 222). Different parameters, such as a location, a size, a shape, and so forth, of the MOG may interrupt the path of travel of the signal 232 in different manners. For example, such parameters of the MOG may change a property or characteristic (e.g., a magnitude, a time of travel) of the signal 232 reflected and received by the transceiver 230. Thus, a property of the reflected signal 232 received by the transceiver 230 may indicate certain information of detected MOG, such as that MOG may not be successfully discharged at a particular row unit 204. The sensor system may also include a different arrangement of components that utilize a signal that may penetrate MOG. For example, the sensor system may include an emitter and receiver pair in which the emitter may transmit a signal (e.g., a radar signal) toward the receiver. The presence of MOG may interrupt the path of travel of the signal and change a property of the signal received by the receiver (e.g., based on a location of the MOG). Thus, additional information of detected MOG may be determined using the property of the signal received by the receiver.

The agricultural system also includes a control system 234 (e.g., an automation controller, an electronic controller, a programmable controller, a cloud computing system, control circuitry) with a processor 236 (e.g., processing circuitry) and memory 238. The processor 236 may be used to execute software code or instructions stored on the memory 238, such as to process signals, control the agricultural system, and/or control the header 200. The term “code” or “software code” used herein refers to any instructions or set of instructions that control the operation of the control system 234. The code or software code may exist in a computer-executable form, such as machine code, which is the set of instructions and data directly executed by the processor 236 of the control system 234, human-understandable form, such as source code, which may be compiled in order to be executed by the processor 236 of the control system 234, or an intermediate form, such as object code, which is produced by a compiler.

As an example, the memory 238 may store processor-executable software code or instructions (e.g., firmware or software), which are tangibly stored on a non-transitory computer readable medium. Additionally or alternatively, the memory may store data. As an example, the memory 238 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 236 may include multiple microprocessors, one or more "general-purpose" microprocessors, one or more special-purpose microprocessors, and/or one or more application specific integrated circuits (ASICS), or some combination thereof. For example, the processor 236 may include one or more reduced instruction set (RISC) or complex instruction set (CISC) processors. The processor 236 may include multiple processors, and/or the memory 238 may include multiple memory devices. The processor 236 and/or the memory 238 may be located in any suitable portion of the agricultural system (e.g., a cab of the agricultural system 100 and/or on the header 200). Further, the control system 234 may be a distributed controller with the multiple processors and/or the multiple memory devices in separate housings or locations (e.g., in the agricultural system, in the header 200, in a remote location, in the cloud).

The control system 234 is communicatively coupled to the MOG sensor system 212 (e.g., to the emitter 214, the receiver 216, the emitter 224, the receiver 226, the transceiver 230). The control system 234 is configured to receive sensor data from the MOG sensor system 212 and operate based on the sensor data. Such sensor data may indicate detection of MOG proximate to or at the conveyors 206, and the control system 234 may output a control signal in response to receipt of such sensor data. As an example, the control system 234 is configured to output a control signal to an actuator 240 of the header 200 to cause the actuator 240 to adjust an operation of the header 200. As another example, the control system 234 is configured to output a control signal to adjust an operation of another part of the agricultural system. As a further example, the control system 234 is configured to output a control signal to provide a notification (e.g., a visual output, an audio output, a communication transmitted to a mobile device). Output of the control signal may facilitate mitigation or addressing of MOG that enters the inlet 106. For instance, the control signal may automatically adjust operation of the agricultural system or prompt a user to adjust operation of the agricultural system to reduce intake of MOG at the inlet 106.

Figure 3:
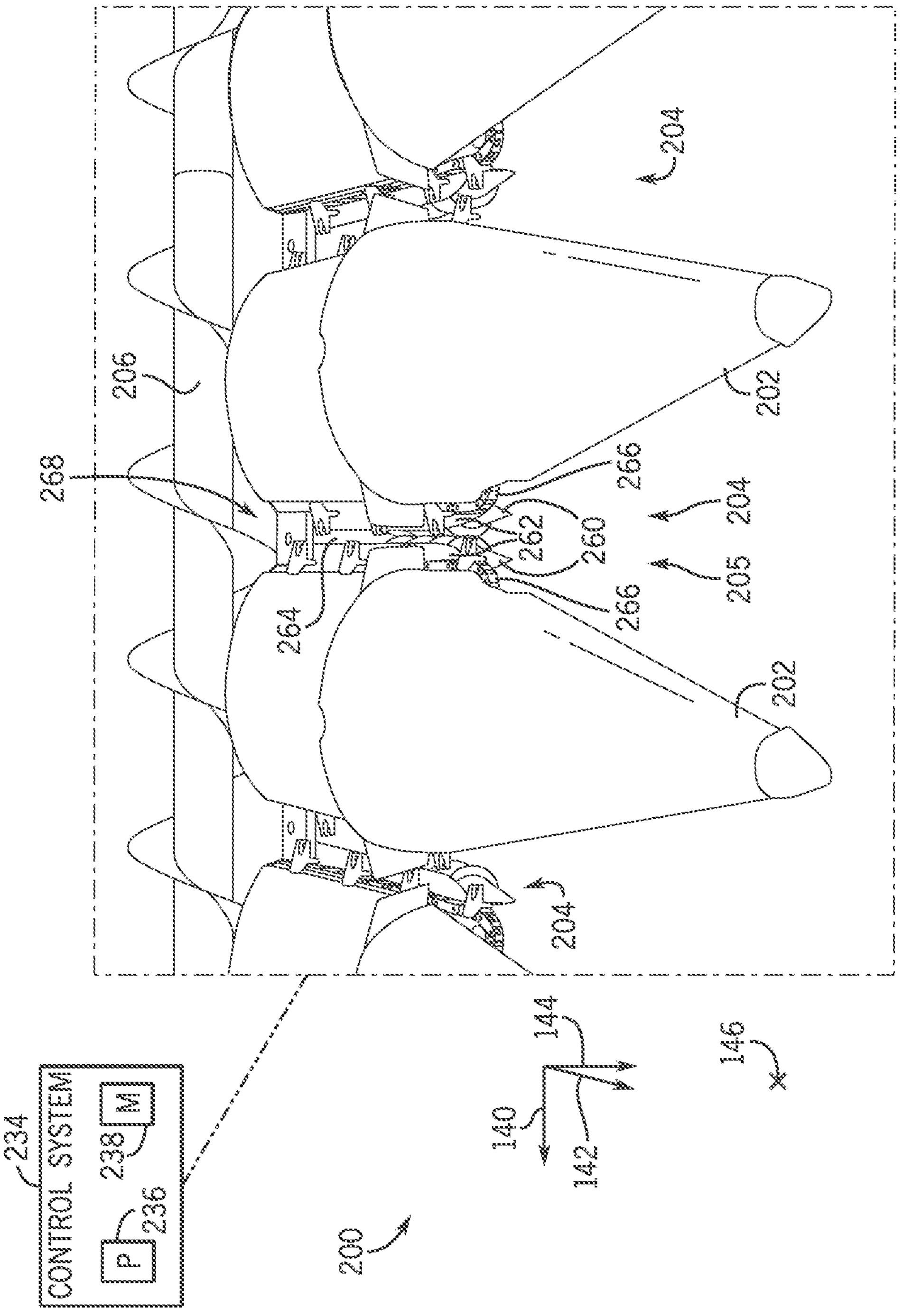
FIG. 3 is a perspective front view of a portion of the header of FIG. 2, in accordance with an embodiment of the present disclosure.

FIG. 3 is a perspective front view of an embodiment of a portion of the header 200. As shown, the portion of the header 200 includes the multiple dividers 202 that direct the crop material to one or more row units 204. Each row unit 204 includes various components that operate to separate the desirable crop material (e.g., ears of corn) from the MOG, carry the crop toward the conveyors 206, and return the MOG to the field. For example, each row unit 204 may include a pair of feed rollers 260 (e.g., snap rollers, stalk rollers, pick rollers) that are configured to grip a portion of the crop (e.g., stalks), such as at or proximate to the picking location 205, and rotate in opposite rotational directions to push the stalk and other MOG of the crop toward the field (e.g., vertically downward along the vertical axis 144; below the header 200) for discharge from the header 200. Each row unit 204 also includes a pair of deck plates 262 that are positioned over the pair of feed rollers 260. Each deck plate 262 extends from a first end to a second end along the longitudinal axis 142, and the pair of deck plates 262 are separated from one another along the lateral axis 140 to define a gap 264. The pair of deck plates 262 are spaced apart so that the gap 264 is sized to enable the MOG to fall or to be pulled (e.g., by the pair of feed rollers 260) through the gap 264, but to block the desirable crop material (e.g., ears of corn) from falling through the gap 264. That is, the deck plates 262 may receive the desirable crop material and block entry of the desirable crop material through the gap 264. Further, each row unit 204 may include a pair of chains 266 (e.g., with lugs) that are configured to drive or push the desirable crop material along the pair of deck plates 262 toward the conveyors 206. In some embodiments, the pair of deck plates 262 are adjustable and may be driven (e.g., via an actuator) toward and away from one another along the lateral axis 140 to change a size of the gap 264 (e.g., a width along the lateral axis 140).

During operation, the agricultural system may navigate in the direction of travel 146 to gather multiple rows of crops. The travel speed (e.g., ground speed) of the agricultural system in the direction of travel 146 may affect operation of the row units 204 to discharge MOG. For example, increased travel speed relative to the speed (e.g., rotational speed) of the feed rollers 260 may bunch or cluster the gathered crops within a row unit 204 and cause the gathered crops to shift along the row unit 204 toward the conveyors 206 and reduce operation of the feed rollers 260 to push the MOG toward the field. Therefore, at least a portion of the MOG may be moved onto the conveyors 206, which may drive the MOG toward the inlet of the agricultural system. The sensor system may detect the presence of such MOG proximate to and/or at the conveyors 206, such as at a rear portion 268 of the row units 204, which may be at least partially aligned with the conveyors 206, at the deck plates 262, or at any part of the row units 204 and/or the conveyors 206 along the longitudinal axis 142. The sensor system may output sensor data to the control system 234 to indicate the presence of MOG. The control system 234 may be configured to adjust operation of a component of the row units 204 in response to receipt of sensor data indicative of MOG proximate to and/or at the conveyors 206. By way of example, the control system 234 may increase the speed of the feed rollers 260 relative to the travel speed of the agricultural system to cause the feed rollers 260 to push the MOG more quickly and facilitate discharge of the MOG through the gap 264 to block movement of the MOG to the conveyors 206. Additionally or alternatively, the control system may reduce the travel speed of the agricultural system relative to the feed rollers (e.g., by reducing rotational speed of ground wheels or tracks of the agricultural system) to reduce bunching of gathered crops within a row unit and reduce shifting of the MOG along the row unit (e.g., toward a rearward portion of the row unit that is proximate to the conveyors 206). In this manner, operation of the control system may reduce presence of the MOG at the conveyors and reduce intake of the MOG at the inlet.

In certain embodiments, the control system 234 is configured to output a control signal to adjust each feed roller 260 or each pair of feed rollers 260 independently of one another. For instance, the control system 234 may output a control signal that adjusts the speed of a particular feed roller 260 (e.g., relative to the travel speed of the agricultural system) without adjusting the speed of remaining feed rollers 260. For example, the control system 234 may determine the location of detected MOG based on received sensor data and determine a speed of a feed roller 260 to be adjusted (e.g., increased) based on the location of the detected MOG, such as based on the location of the MOG indicating the feed roller 260 is not discharging the MOG quickly enough before the MOG is moved to the conveyors 206. In response, the control system 234 may output a control signal dedicated to adjusting the speed of the determined feed roller 260 or determined pair of feed rollers 260. However, the location of the detected MOG may indicate that remaining feed rollers are operating desirably (e.g., at a sufficient speed to discharge MOG before the MOG is moved to the conveyors 206). Therefore, the control signal output by the control system 234 may not cause adjust of the speed of the remaining feed rollers.

Figure 4:
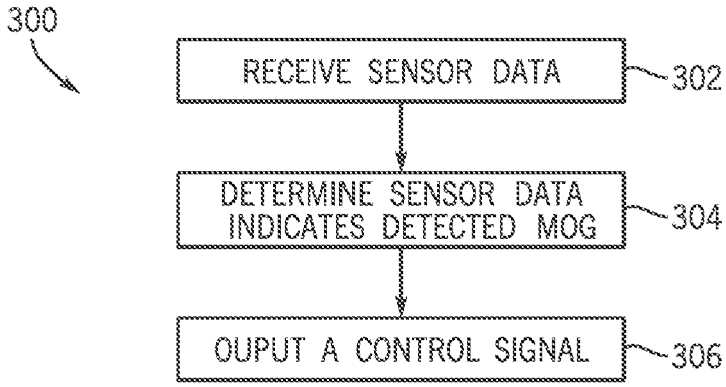
FIG. 4 is a flowchart of a method for operating the agricultural system of FIG. 1 based on crop material detected at the header of FIGS. 2 and 3, in accordance with an embodiment of the present disclosure.
Figure 5:
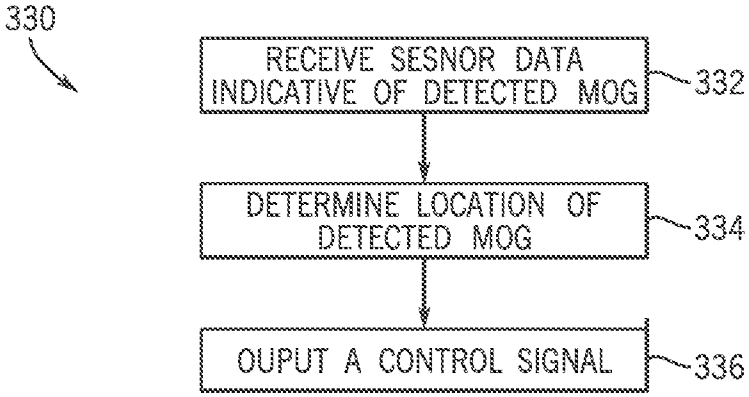
FIG. 5 is a flowchart of a method for operating the agricultural system of FIG. 1 based on crop material detected at the header of FIGS. 2 and 3, in accordance with an embodiment of the present disclosure.

Each of FIGS. 4 and 5 illustrates a respective method for using the sensor system. In some embodiments, each method may be performed by a single respective component or system, such as by the control system disclosed herein (e.g., the processor). In additional or alternative embodiments, multiple components or systems may perform the operations for a single one of the methods. It should also be noted that additional operations may be performed with respect to the described methods. Moreover, certain operations of the depicted methods may be removed, modified, and/or performed in a different order. Further still, the operations of any of the respective methods may be performed in parallel with one another, such at the same time, and/or in response to one another.

FIG. 4 is a flowchart of a method 300 for operating the agricultural system 100 of FIG. 1 based on crop material detected at the header 200 of FIGS. 2 and 3. At block 302, sensor data may be received from the sensor system of the header. Such sensor data may indicate whether a signal transmitted by an emitter is successfully received by a receiver. Additionally or alternatively, the sensor data may indicate a property (e.g., a magnitude, a time of travel) of a signal received by a receiver.

At block 304, a determination is made that the sensor data indicates detected MOG proximate to and/or at the conveyors of the header (e.g., rearward of the picking location). For example, the determination may be made based on the sensor data indicating that a signal is not successfully received by the receiver. The determination may additionally or alternatively be made based on a certain property of a signal received by the receiver indicates detected MOG, such as the property being outside of a range of values to indicate detected MOG proximate to and/or at the conveyors.

At block 306, a control signal may be output in response to determining the sensor data indicates detected MOG. In some embodiments, the control signal may adjust an operation of the agricultural system, such as to increase a speed of a feed roller (e.g., relative to a travel speed of the agricultural system) and/or to reduce a travel speed of the agricultural system (e.g., relative to a speed of a feed roller). As such, the control signal may automatically increase (e.g., without additional user input) discharge of MOG from the header to block movement of MOG to the conveyors. In additional or alternative embodiments, the control signal may provide a notification to a user, such as an operator of the agricultural system, to prompt the user to adjust operation of the agricultural system to block movement of MOG to the conveyors. The notification may include a visual output (e.g., by a light emitter, by a display screen), an audio output (e.g., by a speaker), a communication to a mobile device, and/or any other suitable notification. Thus, the control signal may facilitate improving operation of the agricultural system to block entry of MOG to the agricultural crop processing system.

In some embodiments, the control signal may be output based on a frequency or regularity with which sensor data indicative of detected MOG is received. For example, the control signal may be output in response to receipt of sensor data indicating an object is detected at a threshold quantity of times (e.g., a threshold quantity of occurrences of the signal from the emitter being blocked from receipt at the receiver) or during a threshold duration of time (e.g., a threshold duration of time that the signal from the emitter is blocked from receipt at the receiver, either continuously or intermittently) for an interval of time. The detection of an object at the threshold quantity of times or during the threshold duration of time for the interval of time may verify presence of MOG (e.g., instead of the presence of debris that may be briefly detected by the sensor system; sufficient MOG to warrant the control signal) proximate to and/or at the conveyors.

Furthermore, sensor data indicative of detected MOG at another (e.g., increased) threshold quantity of times or during another (e.g., increase) threshold duration of time may indicate a potential blockage at the header where crop material (e.g., ears of corn, MOG) may not be moved. Thus, MOG (e.g., MOG that is stuck in the row units and/or on the conveyors and not being discharged and/or moved toward the inlet) may be continually detected by the sensor system during the blockage. In response to receiving such sensor data, another control signal may be output to mitigate or address the potential blockage. For example, the control signal may automatically adjust or provide a notification to a user to manually adjust operation of the agricultural system, such as to suspend operation of the agricultural system (e.g., suspend operation of the header, suspend navigation of the agricultural system in the travel direction), adjust movement of the agricultural system (e.g., cause the agricultural system to travel in a direction opposite to the travel direction to reduce harvesting of crops), and so forth.

FIG. 5 is a flowchart of a method 330 for operating the agricultural system of FIG. 1 based on crop material detected at the header 200. At block 332, sensor data indicative of detected MOG may be received. For example, a determination may be made that the sensor data indicates detected MOG based on the sensor data indicating unsuccessful receipt of a signal by the receiver, a certain property of a signal received by a receiver, and/or any of the techniques discussed herein.

At block 334, a location of the detected MOG may be determined. In some embodiments, a row unit corresponding to the location of the detected MOG may be determined, and the determined row unit may indicate an associated feed roller that does not move MOG quickly enough, thereby allowing the MOG to reach a rearward portion of the row unit (e.g., extend vertically above the rearward portion of the row unit) for detection and/or causing the MOG to be moved to the conveyor for detection. For example, each sensor may be associated with a particular row unit, and the sensor data may indicate the corresponding sensor that detects MOG. As such, the sensor that detects MOG may be determined based on the received sensor data, and the row unit associated with the sensor may be determined to be the location of the MOG being detected (e.g., the row unit where the MOG is detected).

At block 336, a control signal may be output in response to determining the location of the MOG. For example, in response to determining that MOG is detected at a particular row unit, the control signal may be output to adjust operation of the particular row unit (e.g., increase the speed of the particular feed roller relative to the speed of feed rollers of other row units). Additionally or alternatively, the control signal may be output to provide a notification of the location of the detected MOG, such as the particular row unit where the MOG is detected. The notification may prompt a user to adjust operation of the agricultural system, such as to manually adjust and/or inspect the particular row unit where the MOG is detected.

In some embodiments, the control signal may be output based on a frequency or regularity (e.g., a quantity of times or a duration of time per interval of time) with which MOG is detected at a location. Further, the frequency may be associated with a particular row unit where MOG is detected. It should be noted that because the conveyors generally direct crop material, and therefore any received MOG, in an inward direction toward the inlet, the sensors associated with more laterally interior row units (e.g., row units positioned relatively more proximate to the inlet) may detect MOG as a result of the conveyors driving movement of MOG received from more laterally exterior row units (e.g., row units positioned more distal to the inlet and more proximate to an end sheet). Accordingly, the sensors associated with more laterally interior row units may detect MOG as a result of operation of the more laterally exterior row units, even though the more laterally interior row units may be operating to discharge MOG at a sufficient rate. However, a row unit that may move MOG more frequently to the conveyors (e.g., the row unit may not operate quickly enough to discharge MOG) may cause its corresponding sensor to detect MOG more frequently relative to a sensor associated with a more laterally exterior row unit. For this reason, the control signal may be output in response to a first frequency in which MOG is detected at a first row unit being a threshold value greater than a second frequency in which MOG is detected at a second, more laterally exterior located row unit (e.g., a row unit located adjacent to the first row unit and more distal to the inlet). Thus, the threshold quantity of times or the threshold duration of time per interval time may vary across the row units (e.g., greater for the more laterally interior row units as compared to the more laterally exterior row units).

Similarly, a location of blockage may be determined based on the sensor data. For example, sensor data indicative of a location where MOG is detected at an increased frequency (e.g., exceeding a threshold quantity of times or exceeding a threshold duration of time per interval time) may indicate a blockage at the location. The control signal may be output based on the blockage at such a location, such as to provide location information to a user.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that features shown and described with reference to FIGS. 1-5 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
a header comprising:
a row unit comprising a feed roller that engages a crop and pulls a stalk of the crop toward a field; and
a conveyor that receives a desirable crop material of the crop from the row unit and directs the desirable crop material of the crop toward an inlet of the agricultural system;
a sensor system that detects presence of material other than grain (MOG) proximate to or at the conveyor; and
a control system communicatively coupled to the sensor system, the control system:
receives sensor data from the sensor system;
determines a location of the presence of MOG proximate to or at the conveyor based on the sensor data;
determines the feed roller associated with the location of the presence of MOG proximate to or at the conveyor; and
outputs a control signal that independently increases a speed of the feed roller in response to the determining the feed roller associated with the location of the presence of MOG present proximate to or at the conveyor.

2. The agricultural system of claim 1, wherein the sensor system comprises an emitter and a receiver; and
wherein the emitter transmits a signal towards the receiver for receipt by the receiver.

3. The agricultural system of claim 2, wherein the conveyor rotates about a rotational axis that directs the desirable crop material of the crop toward the inlet; and
wherein the emitter transmits the signal along the rotational axis.

4. The agricultural system of claim 2, further comprising:
a hood extending over the conveyor at the inlet;
wherein one of the emitter or the receiver is coupled to the hood, and the other of the emitter or the receiver is coupled to a side wall of the header.

5. The agricultural system of claim 1, wherein the sensor system monitors presence of MOG at a rear portion of the row unit adjacent to the conveyor.

6. The agricultural system of claim 1, wherein the speed comprises a rotational speed of the feed roller.

7. An agricultural system, comprising:
a sensor system that monitors presence of material other than grain (MOG) at a location proximate to or at a conveyor; and
a control system communicatively coupled to the sensor system, wherein the control system:
receives sensor data from the sensor system;
determines that the sensor data indicates the presence of MOG at the location proximate to or at the conveyor;
determines a feed roller associated with the location of the presence of MOG proximate to or at the conveyor; and
outputs a control signal in response to the determining that the sensor data indicates the presence of MOG at the location proximate to or at the conveyor;

wherein the control signal comprises independently increasing a speed of the feed roller in response to the determining the feed roller associated with the location of the presence of MOG proximate to or at the conveyor.

8. The agricultural system of claim 7, wherein the sensor system additionally monitors the presence of MOG at a header and rearward of a picking location;

wherein the control system, based on the received sensor data, determines that the sensor data indicates the presence of MOG at the header and rearward of the picking location; and wherein the control system outputs the control signal that reduces a travel speed of the agricultural system in response to the determining that the sensor data indicates the presence of MOG at the header and rearward of the picking location.

9. The agricultural system of claim 1, wherein the feed roller receives the MOG and directs the MOG toward a field.

10. The agricultural system of claim 7, wherein the sensor system comprises an emitter and a receiver; and wherein the sensor data from the sensor system comprises:

a signal transmitted by the emitter; and the signal as transmitted by the emitter and received by the receiver.

11. The agricultural system of claim 10, wherein the sensor system transmits the sensor data to the control system that indicates a property of the signal received by the receiver; and wherein the control system determines that the sensor data indicates the presence of MOG proximate to or at the conveyor based on the property of the signal as indicated by the sensor data.

12. The agricultural system of claim 10, further comprising:

a conveyor that directs desirable crop material of a crop toward an inlet of the agricultural system; and a support positioned forward of the conveyor, wherein one of the emitter or the receiver is coupled to the support.

13. The agricultural system of claim 7, wherein the control system outputs the control signal that provides a visual output, an audio output, or both.

14. A non-transitory, computer readable medium, comprising instructions that, when executed by processing circuitry, cause the processing circuitry to:

receive sensor data;

determine that the sensor data indicates a presence of material other than grain (MOG) proximate to or at a conveyor of an agricultural system, wherein the conveyor receives a crop from a feed roller of the agricultural system and directs a desirable crop material of the crop toward an inlet of the agricultural system;

determine a location of the presence of MOG proximate to or at the conveyor based on the sensor data;

determine a feed roller associated with the location of the presence of MOG proximate to or at the conveyor; and output a control signal that adjusts an operation of the agricultural system in response to the determining that the sensor data indicates the presence of MOG proximate to or at the conveyor and that independently increases a speed of the feed roller in response to the determining the feed roller associated with the location of the presence of MOG proximate to or at the conveyor.

15. The non-transitory, computer readable medium of claim 14, wherein the instructions, when executed by the processing circuitry, further cause the processing circuitry to:

determine a quantity of times or a duration of time associated with the presence of MOG proximate to or at the conveyor based on the sensor data; and output the control signal that adjusts the operation of the agricultural system in response to the determining the quantity of times, the duration of time, or both, exceed a threshold quantity of times or a threshold duration of time, respectively, for an interval of time.

16. The non-transitory, computer readable medium of claim 15, wherein the instructions, when executed by the processing circuitry, further cause the processing circuitry to:

output an additional control signal that suspends the operation of the agricultural system in response to the determining the quantity of times, the duration of time, or both, exceed an additional higher threshold quantity of times or an additional higher threshold duration of time, respectively, for the interval of time.

17. The non-transitory, computer readable medium of claim 14, wherein the instructions, when executed by the processing circuitry, further cause the processing circuitry to:

output the control signal that adjusts the operation of the agricultural system based on the location in response to the determining that the sensor data indicates the presence of MOG proximate to or at the conveyor.

18. The non-transitory, computer readable medium of claim 14, wherein the instructions, when executed by the processing circuitry, further cause the processing circuitry to;

determine that the sensor data indicates the presence of MOG proximate to or at the conveyor based on the sensor data indicating unsuccessful receipt by a receiver of the agricultural system.

* * * * *